Nov. 22, 1938. A. NATOLI 2,137,992

MUSICAL INSTRUMENT VALVE DRIP CUP

Filed Oct. 14, 1937  2 Sheets—Sheet 1

INVENTOR.
Anthony Natoli
BY James Harrison Bowen
ATTORNEY.

Nov. 22, 1938. A. NATOLI 2,137,992
MUSICAL INSTRUMENT VALVE DRIP CUP
Filed Oct. 14, 1937 2 Sheets-Sheet 2

INVENTOR.
Anthony Natoli
BY James Harrison Bowen
ATTORNEY.

Patented Nov. 22, 1938

2,137,992

UNITED STATES PATENT OFFICE 2,137,992

MUSICAL INSTRUMENT VALVE DRIP CUP

Anthony Natoli, Elmhurst, N. Y.

Application October 14, 1937, Serial No. 168,950

1 Claim. (Cl. 84—397)

The purpose of this invention is to provide an improvement in musical instruments of the type having valves with cups at their lower ends, in that the cups are closed to form traps for fluid from the valves, and provided with means for admitting air to equalize the valves without permitting the fluid to drip therefrom.

The invention is a device placed on the lower end of a valve of a musical instrument, having an enclosed area forming a reservoir or trap for holding fluid from the valve, and preferably having a tube extending inward from the side providing an opening communicating with the interior.

In musical instruments of this type, the lower ends of the valves are ordinarily provided with removable cups having openings at the bottom which permit the escape of oil and water leaking through the valve, and this is objectionable because it soils the clothing, and, therefore, the musician is generally very careful to hold the instrument so that the leakage from the valves will drop upon the floor; so that it is desired to provide means for substantially closing the lower ends of the valves which will permit air to enter the valves and, at the same time, permit cleaning by readily removing the cups.

The object of this invention is, therefore, to provide a cup or other device on the lower end of a valve or other part of a musical instrument which will arrest and hold oil or condensation from the valve without interfering with equalizing air, and also without interfering with readily cleaning or disposing of the oil or condensation accumulating therein.

Another object is to provide a cup which forms a closure preventing drip, which may also be used as a seat for the valve spring.

A further object is to provide a closure for the lower ends of musical instrument valves adapted to form a reservoir which may be readily removed and replaced.

And a still further object is to provide a removable closure or reservoir with an opening therethrough for the lower ends of valves of musical instruments, which is of a simple and economical construction.

With these ends in view the invention embodies a relatively small cup, preferably threaded internally with an opening extending through the wall, in which the opening is positioned to prevent drip therefrom.

Other features and advantages of the invention will appear from the following description, taken in connection with the drawings, wherein.

Figure 1:
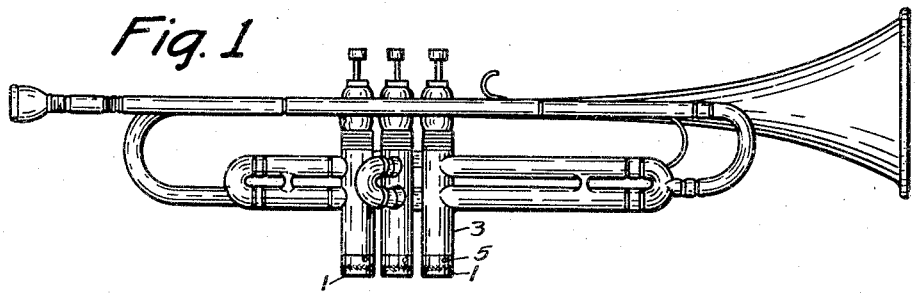
Figure 1 is a view showing a horn with the device attached to the lower ends of the valves thereof.

The drawings illustrate the device which may be made in numerous forms, with Figures 2 to 17 showing a form with an opening or openings in the side, and Figures 18 to 23 showing the opening provided in a tube or material extending upward from the base, which may be considered as the preferred design; however, it will be understood that the scope of this patent application covers a cup at the lower end of the valve or valves of a musical instrument, with an opening formed either in the side or bottom, or located at any point or points, which will admit the egress or entrance of air without permitting the dripping of a fluid therefrom.

In the drawings the device is shown as it may be made, wherein numeral 1 indicates a cup, numeral 2, a tube extending into the cup, and numeral 3, a valve on which the device may be used.

In normal construction, the lower end of the valve 3 is threaded, and the upper end of the cup 1 is provided with a similar thread 4, so that the cup may be screwed upon the lower end of the valve, and, when in place, it will be noted that all oil, or condensation drip from the valve, will pass into the reservoir formed inside of the cup, and, with the opening arranged as shown, either through the side or through a tube in the bottom, it will be practically impossible for the fluid to pass out of the opening until the level of the liquid in the cup corresponds with the height of the opening.

Figure 2:
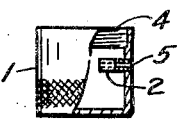
Figure 2 is a view showing the preferred design, in which the opening is formed with a tube extending inward through the wall thereof.
Figure 5:
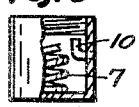
Figure 5 shows another alternate design, with the inner end of the tube bent upward and showing a spring therein.
Figure 15:
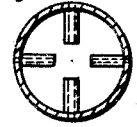
Figure 15 is a plan view of the device shown in Figure 2, in which a plurality of tubes is provided which forms a seat for a spring.

In the design shown in Figure 2, an opening 5 is formed in a small tube or projection 2 extending into the interior of the cup, and it will be noted that one or any number of these projections may be provided, as the cup may be provided with several projections, and these may be arranged as indicated by the numeral 6 and shown in Figure 15, so that they will form a seat for a spring 7, as indicated in Figure 5.

Figure 3:
Figure 3 is a view showing an alternate design, in which the tube is of a conical shape.
Figure 4:
Figure 4 is another alternate design, showing the tube sloping upward.

In the design shown in Figure 3, the projection 8 is formed with a tapering surface, which forms a further guaranty against fluid passing out through the opening extending therethrough, and, in Figure 4, the projection is formed by a tube 9 sloping upward, and it will also be understood that the inner end of the tube or projection may be bent upward as indicated by the numeral 10 in Figure 5.

Figure 6:
Figure 6 shows another alternate design, in which the tube is omitted and an opening is provided through the wall of the cup.
Figure 7:
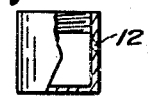
Figure 7 shows another alternate design, in which the opening slants upward.
Figure 8:
Figure 8 shows another alternate design, in which the opening is omitted.

This opening may be placed through a projection extending into the cup, or may be placed directly through the wall of the cup, as shown in Figure 6, in which it is indicated by the numeral 11, or it may slope upward, as shown at 12 in Figure 7, or, in some cases, it may be omitted as shown in Figure 8.

Figure 9:
Figure 9 is another alternate design, in which a projection is provided in combination with an opening, in which the projection forms a seat for the spring.
Figure 10:
Figure 10 is another alternate design showing an internal disc forming a seat for the spring.

The cup may also be provided with a projection 13, as shown in Figure 9, in which a straight opening 14 is illustrated, however, it will be understood that the opening in this design may be formed in any manner. The cup may also be provided with a shoulder 15, as shown in Figure 10, and a disc 16, with an opening 17 therein, may be placed upon the shoulder to form a seat for a spring 7, and it will be understood that the disc 16 may be of any shape and may be formed in any manner.

Figure 11:
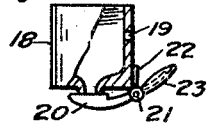
Figure 11 shows another alternate design, in which a pivoted closure is provided at the lower end of the cup.

In Figure 11, the cup, which is indicated by the numeral 18, is provided with an opening 19, and, at the lower end, is a pivotally mounted closure 20, similar to keys used on musical instruments, and this may be pivotally attached at the point 21 and resiliently held closed by a spring 22 so that the handle 23 may be pressed upward to open the lower end of the cup, thereby making it possible to remove fluid therein without removing the cup.

Figure 12:
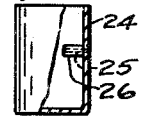
Figure 12 shows another alternate design, in which the threads are omitted and the cup slides over the lower end of the valve.

The cup 24, shown in Figure 12, is similar to that shown in Figure 2 except that the threads are omitted, and the cup is frictionally held over the lower end of the valve. This cup is shown and provided with an opening in a projection 26, however, the opening may be formed in any manner.

Figure 13:
Figure 13 shows another alternate design, in which a sliding closure is provided at the lower end of the cup.
Figure 14:
Figure 14 is a plan view of the closure shown in Figure 12.

In Figure 13, the lower end of the cup is provided with a transverse groove 27, in which a disc 28 may be frictionally and slidably held, and the disc may be provided with a knob 29 by which it may readily be withdrawn to clean the lower end of the instrument or valve. This mounting may be used directly in the lower end of the valve with the cup omitted if desired.

Figure 16:
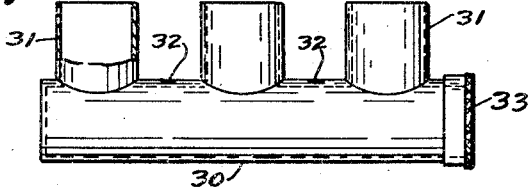
Figure 16 is a view showing another alternate arrangement, in which a common tube is provided with means holding the tube to the ends of all of the valves.

Figure 16 shows an alternate arrangement, in which a tube 30 is provided with bosses 31 adapted to slide over the lower ends of the valves, and this tube may be provided with openings 32 and also a closure 33. It will be noted that this will provide a greater reservoir, and the reservoir may readily be cleaned by removing the closure 23, or the entire device may readily be removed from the lower ends of the valve and drained through the valve openings therein.

Figure 17:
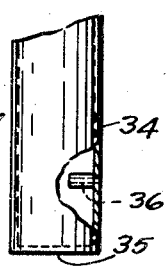
Figure 17 is a view showing the valve casing elongated with an opening in the side thereof, thereby eliminating the cup.

In Figure 17 the valve casing, as indicated by the numeral 34, is lengthened, and the lower end 35 closed, and this is provided with an opening 36 which may be made as shown in this or any of the other designs.

Figure 18:
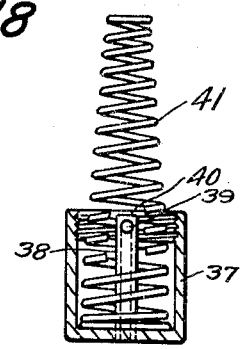
Figure 18 shows another alternate design, in which the tube having the opening therein extends upward from the center of the base of the cup.

In the design shown in Figure 18, the cup, which is indicated by the numeral 37, is provided with an inner vertical tubular member 38 having an opening 39 in the upper end, and in this design the upper end 40 of the tube is closed. This design also shows a spring 41 resting upon the lower end of the cup, however, it will be understood that the spring may be of any type or design and may be held in the cup in any manner.

Figure 19:
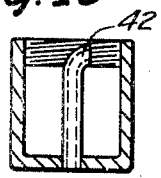
Figure 19 shows a similar arrangement, with the upper end of the tube bent slightly over.

The design shown in Figure 19 is similar, except that the upper end of the tube, which is indicated by the numeral 42, is curved slightly over, as this tube is located directly under the center of the valve stem, and the valve stem is hollow so that oil and water drip downward from the valve stem, and, therefore, it is necessary to either close the upper end of the tube or bend the end over so that the opening therein will not be directly below the center of the valve stem.

Figure 20:
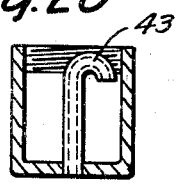
Figure 20 is also similar, with the end of the tube bent completely over.
Figure 21:
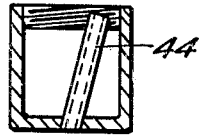
Figure 21 shows the tube sloping toward one side so that the upper end thereof does not register with the opening in the valve, and, therefore, cannot receive drip therefrom.
Figure 22:
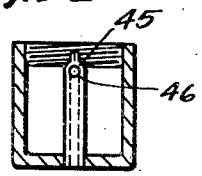
Figure 22 shows another alternate method of closing the upper end of the inner tube.
Figure 23:
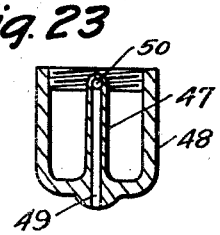
Figure 23 shows another alternate design, in which the cup and tube are made integral.

In Figure 20 the upper end 43 of the tube is bent completely over, and in Figure 21 the tube is positioned at an angle, as indicated by the numeral 44. In Figure 22 the upper end 45 of the tube is crimped together, and the sides are provided with openings 46. In Figure 23 the cup is made of a casting, or formed with an inner tube 47 made of the same material, and in the same operation as that of the cup, which is indicated by the numeral 48, and, in this design, the member 47 has an inner opening 49 with side openings 50 at the upper end.

Figure 24:
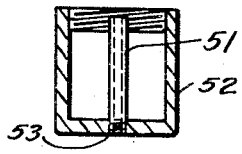
Figure 24 shows another alternate design, in which a tube extends upward from the base, with the upper end of the tube open.

Although a straight tube with an open upper end is not desirable, such a tube is illustrated in Figure 24, in which the tube is indicated by the numeral 51, and the cup by the numeral 52, and, in this design, the tube 51 is threaded into the lower end of the cup, as shown at the point 53, and it will be understood that the tube in this design may be mounted as shown in the other figures, and the tubes in the other figures may also be threaded. In the design shown in Figure 24, as well as in the other designs, the threads may be omitted as shown in Figure 12, so that the cup may slide over the lower end of the valve, and it will be also understood that the cup 52, shown in Figure 24, as well as the cup shown in the other figures, may also represent the lower end of the valve casing, as shown in Figure 17, as the tube 51 may also be mounted in the lower end of the valve case which may be closed.

The tube 51 may also be mounted in cups, such as the cups now used on instruments of this type, as well as being mounted in the lower end of the valve case, and these may be either threaded into the lower end of the cup, as shown in Figure 24, or a relatively small tube may be used, and this may extend through the hole in the lower end of the cup in which it may be sweat, welded or soldered, or held by screw threads with nuts at both sides of the material forming the bottom of the cup, or the tube may be provided with a shoulder inside of the cup adapted to be drawn against the bottom thereof by a nut on the outer end; however, it will be understood that these tubes may be inserted in cups of the type now in use, and they may be secured or mounted in these cups in any manner or by any means.

It will be understood that changes may be made in the construction without departing from the spirit of the invention. One of which changes may be in the use of any means for securing a cup, with an opening in the side thereof, to the lower end of the valve, another may be in the use of other means for forming an opening in the side of a cup for musical instrument valves which prevents fluid dripping out of the cup, and still another may be in the use of a cup of any other type or design.

The construction will be readily understood from the foregoing description. In use the cup may be mounted directly upon the valve case, or formed as an integral part thereof, as shown in Figure 17, or the cups may be provided in combination, or the individual cups may be provided and sold as separate and independent units, and these may be threaded so that they may be screwed upon the lower ends of the valves with the cups normally supplied with the instrument removed, however, it is also understood that these cups may be furnished with thin cylindrical shells so that they will slide over the lower ends of the valves, similar to the caps of lipstick cases, in which they are frictionally held; and, with these cups in place, it will be noted that all drip from the valves will be caught and held in the cups, and, after playing the instrument, the cups may readily be removed, cleaned and replaced. The size of the openings may be varied to permit any amount of air to enter the valves, and as many openings as may be desired may be provided.

Having thus fully described the invention, what I claim as new, and desire to secure by Letters Patent, is:

In a wind instrument of the type having vertically positioned valve casings with the lower ends closed by removable screw caps, said caps characterized by enlarged portions extending downward below the lower ends of the said valve casings, forming reservoirs therein, and also by projections, with openings therethrough extending into the interior of said caps, with the openings providing communicating means between the interior and exterior, and further characterized in that the said openings open into the interior at a point considerably above the lower ends of the caps, preventing normal drainage from the caps until the elevation of fluid therein reaches a predetermined level, and then permitting only slow drainage as a warning that the reservoir is full, said caps with the reservoirs therein being readily removable for cleaning the said reservoirs.

ANTHONY NATOLI.